United States Patent
Wilfong et al.

(10) Patent No.: US 6,381,046 B1
(45) Date of Patent: Apr. 30, 2002

(54) ROUTING METHOD FOR RING NETWORKS, SUCH AS WDM RING NETWORKS FOR OPTICAL COMMUNICATION

(75) Inventors: Gordon Thomas Wilfong, Gillette; Peter M. Winkler, Madison, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/234,826

(22) Filed: Jan. 21, 1999

(51) Int. Cl.$^7$ .............................. H04B 10/20; H04J 14/02
(52) U.S. Cl. ........................ 359/119; 359/124; 370/403
(58) Field of Search ................................ 359/119, 124; 370/403–405

(56) References Cited

U.S. PATENT DOCUMENTS

| | | | |
|---|---|---|---|
| 5,576,875 A | * 11/1996 | Chawki et al. | ............. 359/119 |
| 5,745,269 A | * 4/1998 | Chawki et al. | ............. 359/119 |
| 6,222,653 B1 | * 4/2001 | Asahi | ......................... 359/119 |

OTHER PUBLICATIONS

Ramaswami, et al., "Multiwavelength Optical Networks with Limited Wavelength Converson", *IEEE INFOCOM 97* , pp.489–498 (1997).
T. Carpenter et al., Demand routing and slotting on ring networks. Technical report (1997).
S. Cosares et al., An optimization problem related to balancing loads on SONET ring. *Telecommunications Systems*, 3:165–181 (1994).
A. Frank, "Edge–disjoint paths in planar graphs", J. Combin., Theory Ser. B. 38:164–178 (1985).
S. Khanna, "A polynominal–time approximation scheme for SONET ring loading problem", Bell Laboratories Tech. J. (1997).
A. Schrijver, et al. "The ring loading problem", SIAM J. Disc. Math., (1997).
Ramaswami, R. et al., "Multiwavelength Optical Networks with Limited Wavelength Converson", *Proc. of IEEE INFOCOM*, p.489 (1997).

* cited by examiner

*Primary Examiner*—Kinfe-Michael Negash
(74) *Attorney, Agent, or Firm*—Martin I. Finston

(57) ABSTRACT

We disclose a method for routing a set of demands in a ring network that comprises nodes interconnected by directed links, in which each demand may be routed clockwise or counterclockwise. According to our method, a linear program is solved to obtain a set of routing variables that minimize an objective function. Each routing variable corresponds to a respective one of the demands, and has a value, exemplarily, on the closed interval from 0 to 1. A value of 1 signifies, e.g., clockwise routing, and a value of 0 signifies counterclockwise routing. The objective function describes the value of a load, defined on each link and maximized over all links of the network, so that a solution of the linear program provides a minimum value of the maximized load. The method further comprises rounding the routing variables so that the value of each routing variable falls at 1 or 0. This rounding is carried out such that the maximized load does not exceed the previously-obtained minimum value of the maximized load. The method further comprises routing each of the demands clockwise or counterclockwise, in accordance with the value of its respective routing variable.

15 Claims, 7 Drawing Sheets

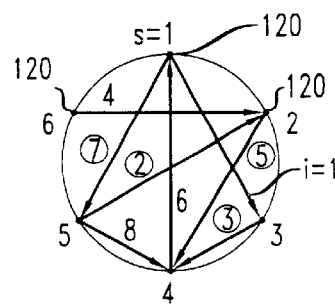
FIG. 6
FIG. 7
| i | $s_i$ | SPLIT ? |
|---|---|---|
| 1 | 1 | N |
| 2 | 5 | Y |
| 3 | 3 | Y |
| 4 | 6 | N |
| 5 | 2 | Y |
| 6 | 4 | N |
| 7 | 1 | Y |
| 8 | 5 | N |
FIG. 8
| $s_i$ | i | j | $i_j$ |
|---|---|---|---|
| 1 | 7 | 1 | 2 |
| 2 | 5 | 2 | 3 |
| 3 | 3 | 3 | 5 |
| 5 | 2 | 4 | 7 |
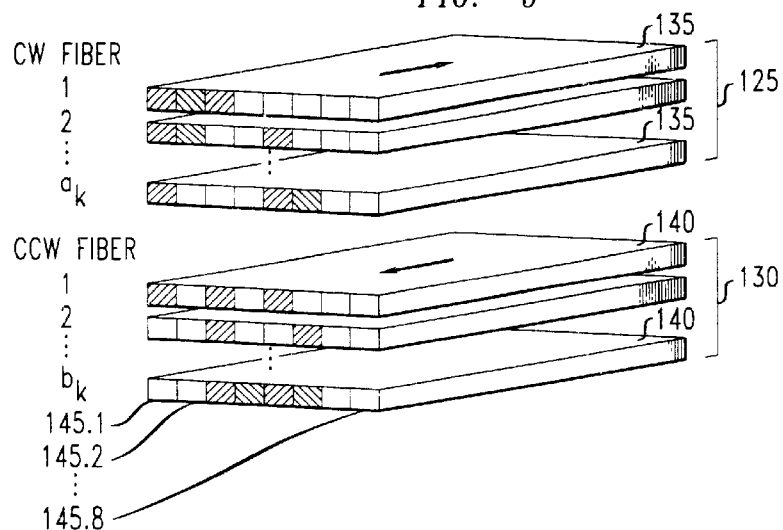
FIG. 9

ROUTING METHOD FOR RING NETWORKS, SUCH AS WDM RING NETWORKS FOR OPTICAL COMMUNICATION

FIELD OF THE INVENTION

This invention relates to the routing of traffic on communication networks of the kind known as ring networks. More particularly, the invention relates to ring networks that support multiple channels, such as multiple wavelength channels, and to routing methods that seek efficient use of a fixed number of such channels.

BACKGROUND OF THE INVENTION

FIG. 1 depicts, in schematic fashion, a typical ring network including nodes 10.1–10.6, clockwise links 15.1–15.6, and counterclockwise links 20.1–20.6. (The physical medium, such as an optical fiber, that embodies a link may carry signals bidirectionally. However, for convenience in the following discussion, it is helpful to represent even bidirectional links as pairs of directed links. A network that can be described in this manner is referred to as a "directed ring network.") A route or connection is a contiguous sequence of links leading from an initial node to a terminal node. For example, route 25 of FIG. 1 is a clockwise route from node 10.2 to node 10.4.

Ring networks have the well-known advantage that when an accident or malfunction causes a link to be cut, thus interrupting traffic, the interrupted traffic can often be carried over alternative routes having the opposite circulatory direction. (I.e., clockwise-routed traffic is re-routed counterclockwise, or vice versa.) As a consequence, practitioners in the field of communication network architecture have regarded ring networks as attractive for many applications.

For any given routing and any given directed link of a ring network, we use the term link load to refer to the number of connections routed through the given link. We use the term ring load to refer to the maximum link load (in either circulatory direction) over the entire network.

It is typical for the links of a ring network to have some maximum capacity; that is, an upper limit on the number of routed demands that can pass through a given link in a given direction. In order to make efficient use of such a ring network, it is advantageous to route the demands in such a way that the ring load is kept as low as possible. Otherwise, there is a danger that some link will too soon reach its maximum capacity, so that no further routing can be made through that link.

Thus, there is a need for a procedure that optimally routes a given set of demands; that is, a procedure that achieves a routing having the minimum possible ring load. Moreover, it is desirable for such a routing to be achievable within a computational time period short enough for practical use in handling real-time traffic. As a general rule, this means that the computational time should be less than an exponential function of the network size.

By way of example, if an optimal routing were computed by exhaustive search and the number of nodes in the network were on the order of fifty or more, the time required for the computation would be prohibitive in applications directed to handling real-time traffic.

Until now, there has been no known procedure for solving the optimal routing problem on a ring network within less than exponential time.

In some types of ring networks, a fixed number of multiple channels are available for carrying signals on each link. These channels may be embodied in various ways, including respective optical fibers, respective electrical conductors, or respective wavelengths of light. For purposes of illustration, we will now discuss optical WDM ring networks, in which each link comprises multiple wavelength channels. However, it should be noted that the principles to be discussed apply generally to other multiple-channel ring networks.

To establish a logical connection between nodes in such a network, an administrative entity first chooses a route, and then it assigns a wavelength to the connection for each link in the route. The network is referred to as wavelength selective (WS) if all of these assigned wavelengths are the same (for the given connection), and wavelength interchanging (WI) if different links (for the given connection) may be assigned different wavelengths. In a WI network, a device which we refer to as a wavelength translator would typically be available at the various nodes to intercept incoming signals on one set of respective wavelengths and re-transmit them, as outgoing signals, on a different set of respective wavelengths.

WS networks will generally be less expensive than WI networks of the same size, because they do not require wavelength translators. However, if the number of available wavelengths is fixed, the WI network will generally have more capacity, because it can reuse the same wavelength on two or more overlapping routes (although of course not on overlapping links). As a consequence, adding a new connection does not necessarily result in utilizing a new wavelength, even if the new route overlaps all of the previously established routes.

Thus, in practice, there will be a tradeoff between the cost advantages of the WS network and the capacity advantages of the WI network.

In WDM ring networks of both kinds, it is advantageous to carry out the task of wavelength assignment (in a general context, this may be thought of as "channel" assignment) using as few wavelengths (or "channels") as possible. If the total number of available wavelength channels is limited, this assures that the capacity of the network is being used efficiently. If the least possible number of wavelengths is used, we say that the wavelength assignment is optimal.

In WI networks, given a particular route set, optimal wavelength assignment is readily carried out in less than exponential time, provided enough nodes are equipped with wavelength translators. A practical method for optimal routing is advantageous in this context because it can be used to minimize (over all possible route sets) the number of wavelengths needed.

In WS networks, the problem of optimal wavelength assignment (for a given route set) is an NP-complete problem. In other words, there is no known way to carry out such an assignment in less than exponential time, and it is extremely unlikely that any procedure for doing so will ever be found.

Under these circumstances, it is highly advantageous to have a wavelength-assignment procedure that can perform, with some performance guarantee, within a practical period of time, such as polynomial time. In general, as the estimated cost (according to the performance guarantee) goes down, the procedure becomes more useful, because it will appear cost-effective to apply it to a wider range of practical problems. A practical method for optimal routing is advantageous in this context because if a wavelength-assignment procedure has a performace guarantee (for a given route set), optimal routing can be used to minimize the estimated cost over all possible route sets. By making the estimated cost as small as possible, the utility of the wavelength-assignment procedure is enhanced.

SUMMARY OF THE INVENTION

We have invented a routing procedure, for directed ring networks, that achieves optimal routing in polynomial time.

When our routing procedure is combined with an appropriate procedure for optimally assigning wavelength channels in WI networks, wavelengths can be assigned in a manner that is optimal over all possible route sets.

When our routing procedure is combined with an appropriate procedure for assigning wavelength channels in WS networks, wavelengths can be assigned, in polynomial time, with a performance guarantee. This guarantee is that the total number of wavelengths used will be no more than twice the ring load obtained by optimal routing, less one.

In one aspect, the invention involves a method for routing a set of demands in a ring network that comprises nodes interconnected by directed links, in which each demand may be routed clockwise or counterclockwise.

According to our method, a linear program is solved to obtain a set of routing variables that minimize an objective function. Each routing variable corresponds to a respective one of the demands, and has a value that falls on a closed interval between endpoints such as the values 0 and 1. A value falling at one of the endpoints signifies clockwise routing, and a value falling at the other signifies counterclockwise routing.

A load of at least one kind is associated with each link of the network. The objective function describes the value of this load maximized over all links of the network, so that a solution of the linear program provides a minimum value of the maximized load.

The method further comprises rounding the routing variables so that the value of each routing variable falls at one of the endpoints. This rounding is carried out such that the maximized load does not exceed the previously-obtained minimum value of the maximized load. The method further comprises routing each of the demands clockwise or counterclockwise, in accordance with the value of its respective routing variable.

In applications to WDM rings, some aspects of the inventive method further involve steps directed to the assignment of wavelength channels. In particular embodiments, the ring network is represented as a pair of directed linear networks, in each of which one node of the ring network is represented as two respective image nodes situated at opposite ends of the linear network. At most L wavelengths are assigned to each of the linear networks, wherein L is equal to the minimum value of the maximized load, as obtained by the routing procedure described above. When the ends of each linear network are rejoined to restore the ring network, no more than L−1 additional wavelengths need to be assigned.

BRIEF DESCRIPTION OF THE DRAWING

FIG. 6 is a directed-chord representation of several demands on a directed ring network, in which some of the routing variables remain non-integral (and thus need to be rounded) after block 45 of FIG. 3.

FIGS. 7 and 8 are tables illustrating a renumbering of demands, according to an exemplary embodiment of the invention, prior to rounding those demands in box 60 of FIG. 3.

FIG. 9 is a schematic depiction of one link of an optical fiber network, in which the link includes multiple optical fibers having a mixture of free channels and occupied channels.

GLOSSARY OF TERMS AND EXPLANATION OF NOTATION

The total number of nodes in a ring is a positive integer n. From each node, a link runs counterclockwise to its predecessor node, and a link runs clockwise to its successor node. Nodes are indexed by the integer k, k=0, 1, 2, . . . , n−1, with node 0 understood to be the successor to node n−1.

Each link can be identified according to the indexing of a characteristic one of its terminal nodes. In one useful scheme, for example, each link bears the index of the node at its counterclockwise end.

Each demand is represented as an ordered pair of indices s, t, identifying, respectively, the initial ("source") and terminal ("target") nodes that are to be connected. The total number of demands is a positive integer m. Demands are indexed by the integer i, i=1, . . . , m. Thus, the demand set is represented by $\{(s_1, t_1), (s_2, t_2), \ldots, (s_m, t_m)\}$, where, for all values of the index i, $s_i \neq t_i$.

If a demand $(s_i, t_i)$ is routed clockwise, each link on that route has an index k that belongs to the closed interval $[s_i, t_i-1]$, since the last link is indexed by the node that precedes the terminal node $t_i$.

If a demand $(s_i, t_i)$ is routed counterclockwise, each link on that route has an index k that belongs to the interval $[t_i, s_i-1]$. This is because this interval is still taken clockwise, and the last link of this (clockwise) interval is indexed by the node that precedes (according to the clockwise indexing scheme) the initial node of the route.

As shown, for example, in FIGS. 2A–2D, each demand may be graphically represented as a directed chord of a circle, drawn from the initial node to the terminal node. For purposes of implementing our routing procedure, it is convenient to classify demands as according to whether or not they are parallel. Parallelism is conveniently defined with reference to the directed-chord representation of demands.

Figure 1:
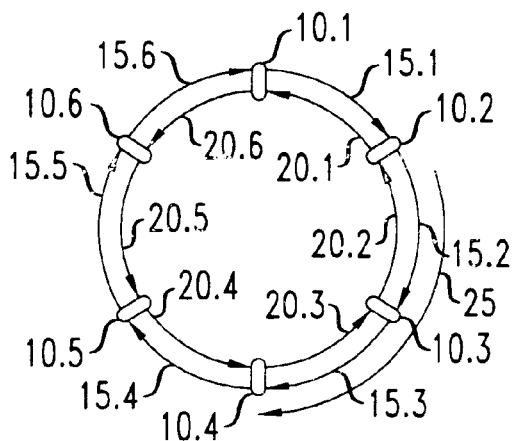
FIG. 1 is a schematic diagram of an illustrative directed ring network.
Figure 2A:
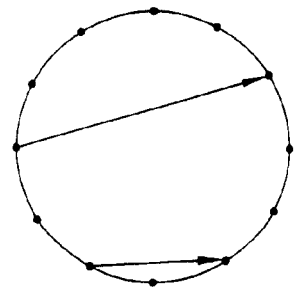
FIGS. 2A–D illustrate the four ways in which a pair of demands (represented as directed chords of a circle) is classified as parallel for purposes of practice of the invention.
Figure 2B:
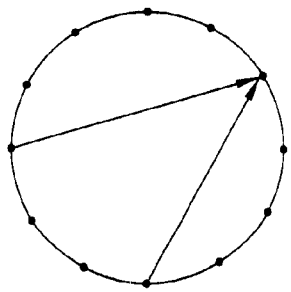
Figure 2C:
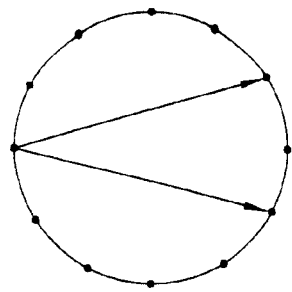
Figure 2D:
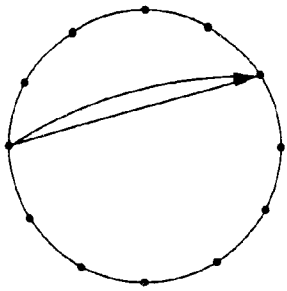

Two demands $(s_i, t_i)$ and $(s_j, t_j)$ are parallel if either of the following two conditions is met:
   (a) the clockwise intervals $[s_i, t_i]$ and $[t_j, s_j]$ intersect at most at their endpoints; or
   (b) the clockwise intervals $[t_i, s_i]$ and $[s_j, t_j]$ intersect at most at their endpoints. With reference to the graphical representations of FIGS. 2A–2D, there are four ways for a pair of demands to be parallel:
   (a) The demands do not intersect, the corresponding directed chords intercept respective, disjoint, spatially separated arcs of the circle, and the respective heads (or tails) of these arcs can be connected, along the circle, without traversing either of the disjoint arcs (FIG. 2A).
   (b) The directed chords intersect only at their respective heads (FIG. 2B).
   (c) The directed chords intersect only at their respective tails (FIG. 2C).
   (d) The directed chords coincide (FIG. 2D).

DETAILED DESCRIPTION

First, we discuss a problem which we refer to as DIRECTED RING ROUTING (DRR).

A set of m variables $x_1, x_2, \ldots, x_m$, which we refer to as "integer routing variables," are defined as follows: $x_i$ is equal to 1 if the i'th demand is routed clockwise, and $x_i$ is equal to 0 if the i'th demand is routed counterclockwise. A routing x is a particular set of values for the m integer routing variables.

The symbol L denotes the ring load; that is, the greatest of all the clockwise and counterclockwise link loads.

The object of DRR is to find a routing x which minimizes L; that is, to find a routing for which the ring load is equal to the smallest possible ring load $L_{OPT}$.

DRR is an integer programming (IP) problem. Direct methods using IP techniques cannot, in general, solve such problems in polynomial time. (The complexity of, e.g., a routing algorithm is said to be polynomial if the computation time is bounded by a polynomial in the number of nodes in the ring and the number of demands.) However, if the m variables are permitted to take on continuous real values on the closed interval from 0 to 1, the problem is transformed to a Linear Programming (LP) problem, which can be solved, by standard methods, in polynomial time.

We refer to this LP problem as RELAXED DIRECTED RING ROUTING (RDRR). The m variables, denoted $\hat{x}_1, \hat{x}_2, \ldots, \hat{x}_m$, are referred to as real routing variables. The value of each of the real routing variables $\hat{x}_i$ is interpreted as that fraction of the corresponding demand that is routed in the clockwise direction. The fraction routed counterclockwise is $1-\hat{x}_i$. A demand that is partially routed clockwise and partially routed counterclockwise is referred to as a split demand.

The real routing variables are here described as assuming values on the closed interval from 0 to 1. Although not preferred, it is possible to define other ranges for the values assumed by the real routing variables. However, such variations do not change the basic nature of the procedures that we will describe here. Therefore, our designation of the endpoints of this interval as 0 and 1 is not meant to be limiting, but instead is meant as a representative example. Similarly, as will be seen, certain decision steps may rely upon one of these endpoints, or upon the midpoint ½ of the interval as thresholds. These thresholds may shift in value when other endpoints are designated. Thus, our designation of certain thresholds as those that pertain when the [0, 1] interval is used is not meant to be limiting, but instead is also meant as a representative example.

The solution to RDRR will generally include split demands. Further processing is required in order to unsplit these demands, so that the final solution is an integer solution. Because RDRR contains DRR as a special case, the optimal ring load $\hat{L}_{OPT}$ obtained by solving RDRR will be no greater than $L_{OPT}$. We have found a method for unsplitting the split demands, and thus for arriving at an integer solution, without increasing the ring load beyond $L_{OPT}$. Surprisingly, we have discovered that this can also be accomplished in polynomial time.

The object of RDRR is to find a set of values for the real routing variables that minimizes the objective function L. The constraints for this LP problem may be stated as follows: each clockwise link load must be less than or equal to L; each counterclockwise link load must be less than or equal to L; and each real routing variable must be non-negative and less than or equal to 1.

Further aspects of our method for solving DRR will now be discussed with reference to FIG. 3. First, as shown at block 30 of the figure, we solve RDRR to obtain $\hat{L}_{OPT}$ and optimal values for the real routing variables $\hat{x}_1, \hat{x}_2, \ldots, \hat{x}_m$. We refer to this solution as flush if the real routing variables sum to an integer; that is, if $$r = \sum_{i=1}^{m} \hat{x}_i$$

is an integer.

If the test indicated at block 35 of the figure determines that the solution is flush, we proceed to block 45. Some of the unsplitting is carried out in block 45, as explained below.

If the test indicated at block 35 determines that the solution is not flush, additional constraints are added to the linear program, as indicated at block 40. One constraint is that the sum of the real routing variables must equal the floor of r (i.e., the largest integer that is less than or equal to r). An alternate constraint is that the sum of the real routing variables must equal the ceiling of r (i.e., the smallest integer that is greater than or equal to r). We have mathematically proven that at least one of these alternate constraints will force a solution that: (a) is flush, and (b) has a ring load that is no greater than $L_{OPT}$.

From the solutions of the linear programs to which, respectively, the floor and ceiling constraints have been added, we choose the flush solution having the smaller ring load. We then proceed to the operations represented in the figure by block 45.

Block 45 represents the first of two unsplitting phases. In this phase, parallel pairs of split demands are identified and operated on. Represented by block 50 is a search for any remaining such pairs. At block 55, one of the remaining parallel pairs is obtained, and at least one of the two demands is unsplit. This unsplitting is described in further detail below, in connection with FIG. 4. The operations in block 45 are iterated until no remaining split demand is parallel to any other remaining split demand. (The routing variables output from block 45 are indicated in FIG. 3 as $x_i$ if they are integer valued (i.e., not split), and as $\hat{x}_i$ if they are still split.) We then proceed to the second unsplitting phase, represented by block 60.

At block 60, all of the remaining split demands are unsplit. The procedure for carrying this out is described in detail below, in connection with FIG. 5. The output of block 60 is a set of optimal integer values $x_1, \ldots, x_m$ for the routing variables, and a ring load L which is equal to the minimum value $L_{OPT}$.

Figure 3:
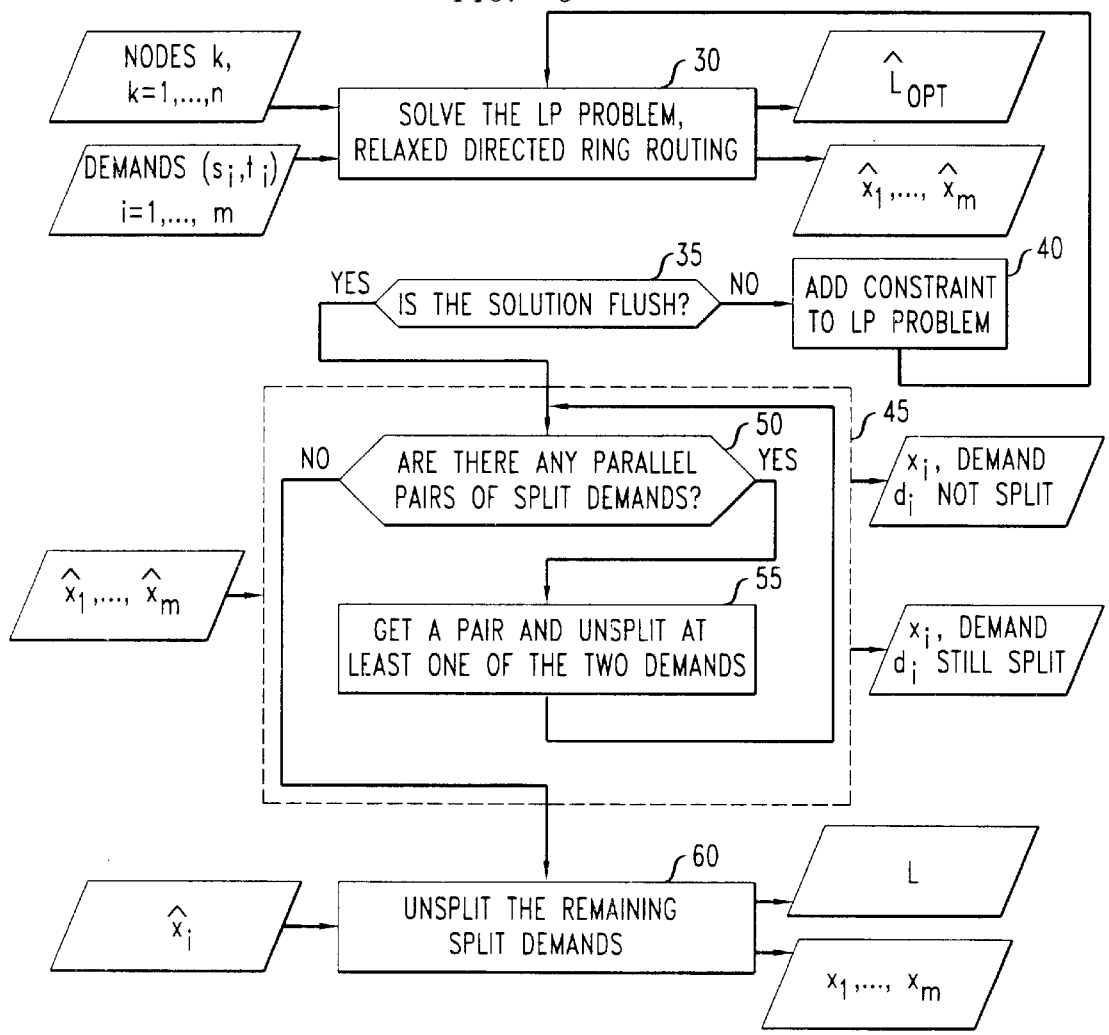
FIG. 3 is a flowchart illustrating an examplary embodiment of the invention at a high conceptual level.
Figure 4:
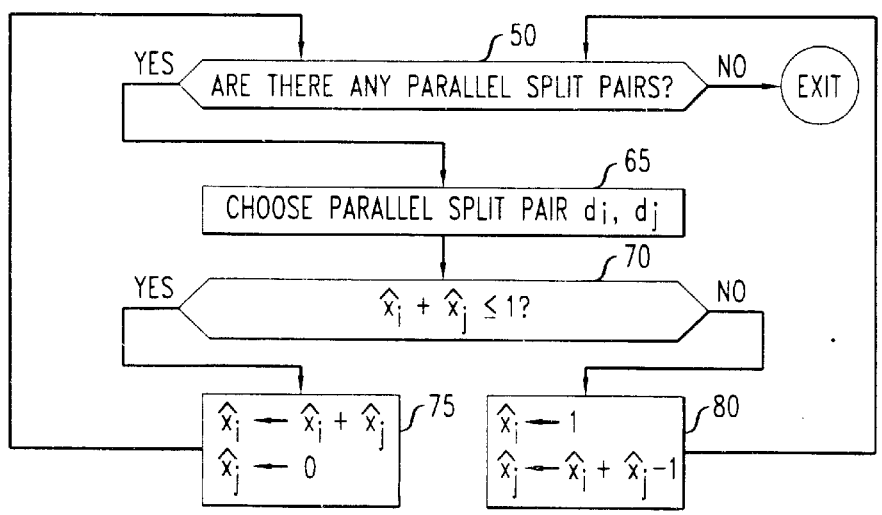
FIG. 4 is an expanded flowchart of block 45 of FIG. 3.

FIG. 4 is an expanded view of block 45 of FIG. 3. The block numbered 50 is the same in both figures. Block 55 of FIG. 3 is expanded into blocks 65–80 of FIG. 4.

Turning now to FIG. 4, if the search indicated at block 50 yields further parallel split pairs, one such pair $d_i$, $d_j$ is selected at block 65. At block 70, a test is performed on the corresponding real routing variables $\hat{x}_i$, $\hat{x}_j$. If the sum of these variables is no more than 1 (or, alternatively, if the sum is less than 1), then $\hat{x}_i$ takes on the value of this sum, and $\hat{x}_j$ takes on the value 0, as shown at block 75. Otherwise, $\hat{x}_i$ takes on the value 1, and $\hat{x}_j$ takes on the value $\hat{x}_i + \hat{x}_j - 1$, as shown at block 80. Significantly, we have mathematically proven that this operation cannot increase the ring load.

The procedure of blocks 50–80 is iterated until there are no more parallel split pairs. At that point, there are only: (a) demands having integer routing variables, and (b) demands that are split but not parallel to any other split demand. In FIG. 3, the outputs of block 45 that are shown as $x_i$ are the routing variables for demands of the first kind, and the outputs shown as $\hat{x}_i$ are the routing variables for demands of the second kind. The same routing variables $\hat{x}_i$ are shown in FIG. 3 as the inputs to block 60.

Figure 5:
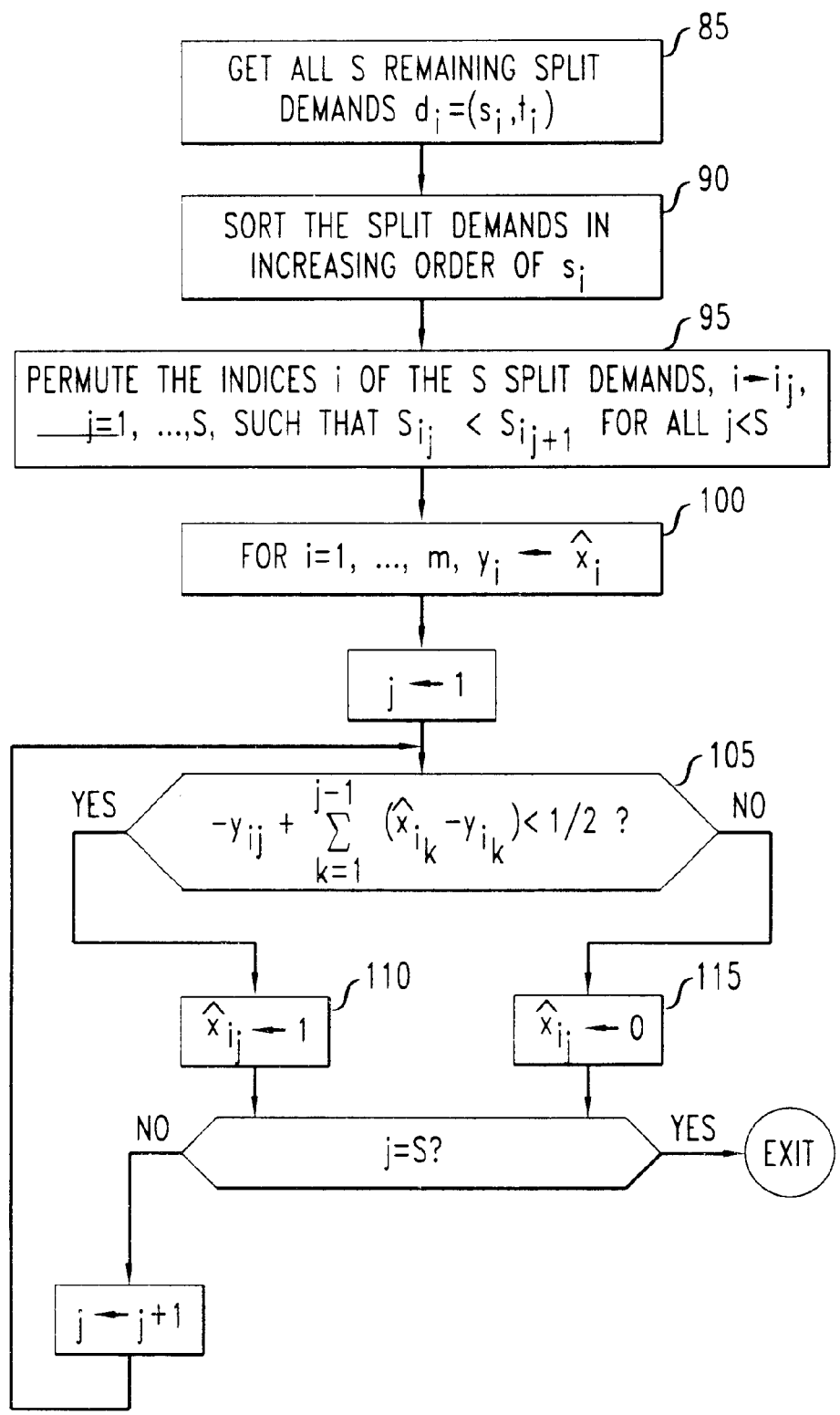
FIG. 5 is an expanded flowchart of block 60 of FIG. 3.

FIG. 5 is an expanded view of block 60 of FIG. 3. Indicated at block 85 of FIG. 5 is the step of making all of the remaining split demands $d_i32$ ($s_i$, $t_i$) accessible for further operations. At block 90, these split demands are sorted in increasing order of the corresponding source node $s_i$. The symbol S is here used to denote the total number of these split demands.

It should be noted in this regard that an equally effective alternative to ordering the split demands by source node is to order them by target node. It should also be understood that, strictly speaking, the split demands are sorted in a circular order, since the highest-numbered node (followed by the lowest-numbered node) need not appear at the end of the ordering.

Each of the S split demands $d_i$ has a respective index i lying on the interval from 1 to m. At block 95, a permutation of these indices is defined such that the smallest of the indices i is assigned to the demand having the lowest-numbered source node, the next smallest index is assigned to the demand having the next-lowest source node, etc. The symbol $i_j$ is used to denote indices as renumbered according to this permutation. The sub-index j takes on values in the interval from 1 to S. As a result of the permutation, it will be true for all j<S that $s_{i_j} < s_{i_{j+1}}$.

(It will be understood that the operations of blocks 90 and 95 are shown as separate steps in the figure for pedagogical purposes only. Procedures in which these operations are most accurately understood as belonging to a single step are also within the scope and spirit of our invention.)

An example of this permutation is illustrated by FIGS. 6–8. In FIG. 6, eight demands are routed in a network having six nodes 120. The demands numbered 1, 4, 6, and 8 are not split, but the demands numbered 2, 3, 5, and 7 are split. (The indices of the split demands are circled in the figure.)

In the table of FIG. 7, each row corresponds to a respective demand. The rows are arranged in increasing numerical order by demand index. The second column of the table indicates the source node of each demand, and the third column indicates whether the corresponding demand is split.

In the table of FIG. 8, each row corresponds to a respective one of the split demands. The rows are arranged in increasing numerical order by source node. The corresponding demand indices are indicated in the second column. The permuted demand indices are indicated in the fourth column. Thus, both the first and fourth columns are in increasing numerical order. The sub-indices j=1, 2, 3, 4 are indicated in the third column. This table shows that under the permutation, the index i=7 is mapped to the index $i_1=2$, the index i=5 is mapped to the index $i_2=3$, the index i=3 is mapped to the index $i_3=5$, and the index i=2 is mapped to the index $i_4=7$.

Turning back to FIG. 5, we introduce at block 100 the dummy variable $y_i$. Initially, as indicated at block 100, for each value of the index i, i=1, ..., m, the variable $Y_i$ is set equal to the corresponding variable $x_i$. Then, the operations of blocks 105–115 are performed iteratively, with one iteration for each value of j, j=1, ..., S. At block 105, we evaluate the following quantity:

$$-y_{i_j} + \sum_{k=1}^{j-1} (\hat{x}_{i_k} - y_{i_k}).$$

If this quantity is less than ½ (or, alternatively, if it is at most ½), we assign the value 1 to the current split routing variable $\hat{x}_{i_j}$, as indicated at block 110. However, if this quantity is at least ½ (or, alternatively, it is greater than ½), we assign the value 0 to the current split routing variable.

After the last iteration of blocks 105–115, each of the m routing variables will have the value 0 or the value 1. Thus, the routing problem will be completely solved. The resulting ring load L will equal the optimal ring load $L_{OPT}$ obtainable, in principle, by directly solving DRR.

We have described a procedure for optimally solving the directed ring routing problem. In fact, a similar procedure is readily used to solve a more general problem which includes directed ring routing as a special case. We refer to this more general problem as the MINIMUM OVERLOAD (MO) problem.

The MO problem is conveniently described with reference to FIG. 9. Depicted in the figure are a clockwise link 125 and a counterclockwise link 130 of a directed ring network. For each link k there are some number $a_k$ of clockwise channels 135 and some number $b_k$ of counterclockwise channels 140. (The k'th clockwise link is the link from node k−1 to node k. The k'th counterclockwise link is the link from node k to node k−1.) The numbers $a_k$ and $b_k$ may vary from link to link. Often, these channels will be embodied in respective optical fibers. For purposes of this discussion, we will refer to these channels as "fibers" in order to distinguish them from the various included channels that they may carry. However, the scope of the invention is not limited to embodiments in which optical fibers are used in this manner.

Each fiber 135, 140 carries one or more communication channels (referred to above as the "included" channels). In the figure, each fiber is depicted as carrying eight of these channels, indicated by reference numerals 145.1–145.8. However, the total number of these channels may vary from fiber to fiber.

A given channel on a given fiber may be occupied by a previously routed demand. In the figure, occupied channels are indicated by shading. For example, occupied channels include the first three channels of the first clockwise fiber, the first, second, and fifth channels of the second clockwise fiber, and the first, third, and fifth channels of the first counterclockwise fiber. If a channel is not occupied, we refer to it as a free channel.

The total number of free channels on a fiber is here referred to as the capacity of the fiber. If a number of demands is routed on a fiber that is in excess of the capacity of the fiber, we refer to that excess as the overload of the fiber.

The object of MO is to route a new set of demands such that the greatest of all of these overloads (over all fibers in all links in both circulatory directions) is minimized. That is, the object of MO is to minimize the ring overload. One significant advantage of solving MO is that the solution reveals the least amount of additional capacity needed (in any fiber) to handle the given demands.

Let $\alpha_{k,i}$ represent the number of free channels on fiber i of clockwise link k, i=1, . . . , $a_k$. Let $\beta_{k,i}$ represent the number of free channels on fiber i of counterclockwise link k, i=1, . . . , $b_k$. Let $A_k$ be the number of clockwise demands routed on link k, and let $B_k$ be the number of counterclockwise demands routed on link k.

To find the maximum overload on any, e.g., clockwise, fiber of link k, sum all of the free channels over all fibers of the link, and take the excess of $A_k$ over this sum. Because this excess can be spread over $a_k$ fibers, no one fiber needs to carry an overload greater than $1/a_k$ times this excess, rounded up to the closest integer. An analogous argument applies to the counterclockwise links.

Therefore, the overload of link k is the greater of the following two expressions:

$$\Omega_k^A = \left\lceil \frac{A_k - \sum_{i=1}^{a_k} \alpha_{k,i}}{a_k} \right\rceil, \Omega_k^B = \left\lceil \frac{B_k - \sum_{i=1}^{b_k} \beta_{k,i}}{b_k} \right\rceil.$$

Formally stated, the object of MO is to find integer routing variables $x_1, x_2, \ldots, x_m$ which minimize $\Omega$, defined by:

$$\Omega = \max\left(\max_k \Omega_k^A, \max_k \Omega_k^B\right).$$

Our procedure for solving MO is first to define a linear programming problem, which we refer to as RELAXED MINIMUM OVERLOAD (RMO), in which the routing variables are permitted to be real, rather than integer, routing variables. RMO is solved by conventional LP techniques. Then a rounding procedure is carried out to eliminate all split demands, so that a set of m integer routing variables is obtained.

Formally stated, the object of RMO is to find the m real routing variables $\hat{x}_1, \hat{x}_2, \ldots, x_m$ that minimize $\Omega^*$, where $\Omega^*$ is defined by:

$$\Omega^* = \max\left\{\max_k\left(\frac{A_k^* - \sum_{i=1}^{a_k} \alpha_{k,i}}{a_k}\right), \max_k\left(\frac{B_k^* - \sum_{i=1}^{b_k} \beta_{k,i}}{b_k}\right)\right\},$$

$$A_k^* = \sum_i \hat{x}_i,$$

(summation taken over clockwise-routed demands on link k), $$B_k^* = \sum_i (1 - \hat{x}_i)$$

(summation taken over counterclockwise-routed demands on link k).

Figure 10:
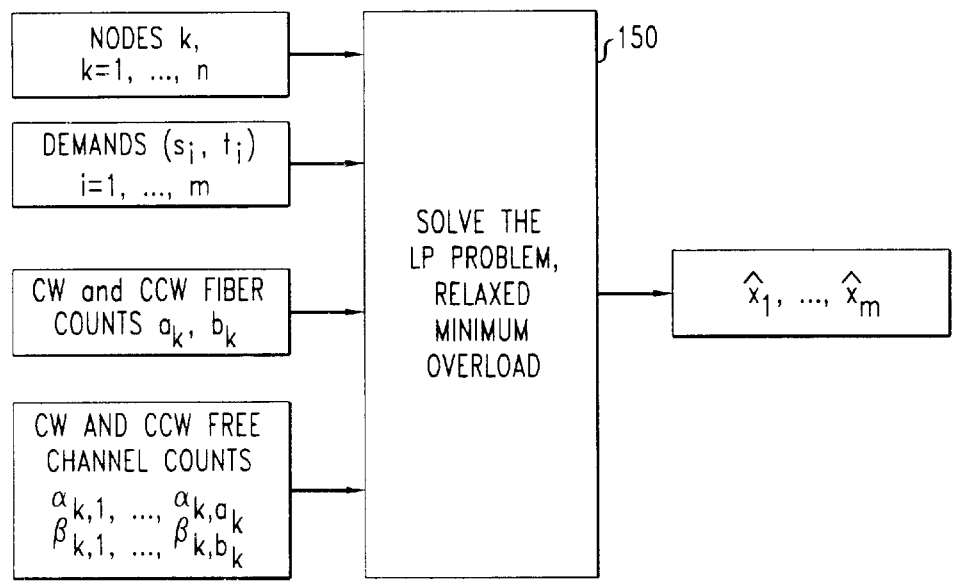
FIG. 10 is one block of a flowchart such as FIG. 3, meant to replace block 30 of FIG. 3 when the optimization problem to be solved is the Relaxed Minimum Overload problem, instead of the Relaxed Directed Ring Routing problem.

In our procedure for solving RMO, block 150 of FIG. 10 takes the place of block 30 of FIG. 3 (in which RDRR is solved). The remaining steps for solving MO are essentially the same as the steps shown in FIGS. 3–5 for solving DRR.

One special case of MO is the problem that we refer to as the MINIMUM FIBER LOAD (MFL) problem. MFL may be stated with reference to a directed ring network in which the number of fibers may vary from link to link. Because there may be multiple fibers on at least some links, a given link may have a relatively high total load, but a relatively small load per fiber. (Each fiber load is totaled irrespective of individual channels on the fiber.) The object of MFL is to route a new set of demands such that the maximum fiber load (taken over all clockwise and counterclockwise links of the network) is minimized. MFL is derived from MO by simply setting the number of free channels on each fiber to 0. That is, each of the $\alpha_{k,i}$ and $\beta_{k,i}$ is set to 0.

Moreover, the problem DRR is derived from MFL by assigning precisely one fiber to each link. That is, each of the $a_k$ and $b_k$ is set to 1.

Solutions of optimal routing problems on directed ring networks find useful application, inter alia, to WDM ring networks. The solution to DRR minimizes the ring load; i.e., the greatest link load of a given WDM network for a given demand set. Because a distinct wavelength must be assigned to each demand routed over a given link, the ring load is also the greatest number of wavelengths used on any one link of the network.

If the network is a WI network having a wavelength translator at each node, it will be possible to route all of the demands using a number of distinct wavelengths no greater than the ring load. This is clearly the case, because: (a) each demand can be assigned a new wavelength on each link as required to avoid using the same wavelength twice on any link; and (b) if there are enough wavelengths to carry all demands on the most heavily loaded link (i.e., a number of wavelengths equal to the ring load), then there are enough wavelengths to carry all demands on all of the other links.

In fact, it is not necessary to have a wavelength translator at every node. As we explain below, it is possible, with only one wavelength translator, to route all demands of a given demand set using a number of distinct wavelengths no greater than the ring load.

In a ring in which at least some of the links comprise multiple fibers, it will often be useful to know how small the maximum fiber load can be made, because enough wavelengths need to be made available to carry this load. The solution to MFL, discussed above, provides the answer to this question. Similarly, the solution to MO provides the minimum number of additional wavelengths that must be made available to the fibers in order to satisfy the given demands.

For a given routing, it is desirable to use the least possible number of wavelengths needed to satisfy the given set of demands. The routing is preferably the optimum routing (as determined, e.g., by solving DRR), so that the number of wavelengths is minimized not only over all possible wavelength assignments, but also over all possible routings.

However, if the network is a WS ring network, the problem of assigning the least possible number A of wavelengths to satisfy a given routing (having a given ring load L which is not necessarily optimal) is an NP-complete problem. Although it will not generally be possible to provide an exact solution to such a problem in less than exponential time, it is possible to provide a useful, approximate solution in polynomial time. We now describe such a procedure, which guarantees to use no more than 2L−1 distinct wavelengths.

It should be noted in this regard that the optimum number Λ of assigned wavelengths (which can be evaluated only by solving an NP-complete problem) cannot be less than the given ring load L. Therefore, 2L−1 cannot be more than 2Λ−1. Therefore, the guarantee to use no more than 2L−1 distinct wavelengths carries with it the important performance guarantee that no more than 2Λ−1 wavelengths will be used; that is, that the number of wavelengths assigned will be no more than twice the optimum number, less 1.

Figure 11:
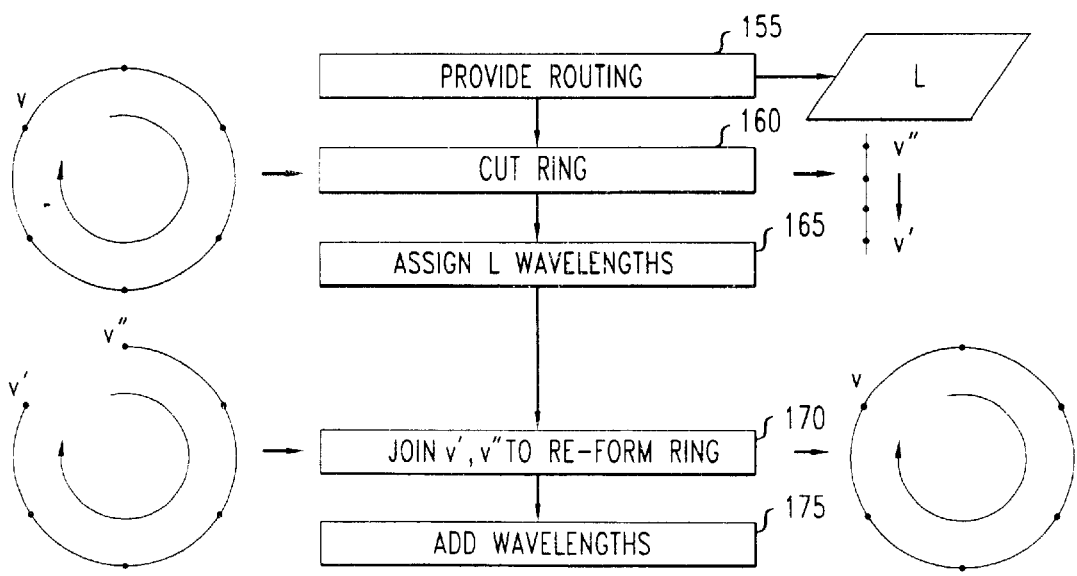
FIG. 11 is a flowchart illustrating a wavelength-assignment procedure according to the invention in some embodiments.

Turning now to FIG. 11, a routing is provided as indicated at block 155. (Preferably, this routing is a solution of DRR.) This routing has a ring load L.

After block 155, the directed ring is treated as two separate rings, one clockwise and the other counterclockwise. Each of these separate rings is individually subjected to the operations represented in the figure by blocks 160–175, which are described below. (By way of illustration, the figure includes sketches of the clockwise ring at various stages of this procedure.)

The ring is cut at a selected node v, as indicated at block 160. Node v is preferably a node over which the least number of demands is routed, not counting demands that begin or end at that node. It can be guaranteed that the number k of these demands is no greater than L−1. That is because even if every link has a load L, it will still be possible to find a node v where some demand begins or ends. If such a demand is not counted, then the number of remaining demands routed over node v must be less than L.

When the ring is cut, it is converted to a directed linear network. A copy v' of node v appears at one end of the network, and a second copy v" appears at the other end. There is no link directly connecting v' to v". Each demand originally represented as (s, v) is replaced by the demand (s, v'). Each demand originally represented as (v, t) is replaced by the demand (v", t). Each demand (s, t) originally routed through v is replaced by the pair of sub-demands (s, v'), (v", t).

A well-known procedure, often known as a "greedy algorithm," can be used to assign precisely L wavelengths to the demands, such that no two overlapping demands are assigned the same wavelength. (Below, we will refer to wavelength-assignment as "coloring.") The coloring step is indicated in the figure at block 165. (Below, we describe the greedy algorithm in greater detail, with reference to FIG. 14.)

As noted, each demand (s, t) originally routed through v is replaced by a pair of sub-demands (s, v'), (v", t). At worst, there will be L−1 sub-demands (s, v'), and L−1 sub-demands (v", t).

At block 170, the ring is rejoined at node v (which now replaces nodes v' and v"). Each of the L−1 sub-demands (s, v') is rejoined to a corresponding one of the L−1 sub-demands (v", t), to form L−1 rejoined sub-demand pairs. In the worst case, each of these pairs has two distinct colors.

In general, it would not be permissible to simply choose one color from each pair, and assign that color to the rejoined pair. Such a procedure would generally be impermissible because the rejoined demand would be likely to overlap another demand having the same color.

If a wavelength translator is available at the rejoined node v, then each of these pairs can keep its two distinct colors. Thus, with a single wavelength translator, a network can satisfy all of the routed demands using L wavelengths.

If the network is a WS network, no wavelength translator is available. In that case, we introduce L−1 additional wavelengths, one for each of the rejoined sub-demand pairs, as indicated at block 175 of FIG. 11. (The same set of additional wavelengths may be used for both the clockwise ring and the counterclockwise ring.) Thus, the routed demands are satisfied by the L original wavelengths, plus L−1 additional wavelengths, or a total of 2L−1 wavelengths.

Figure 12:
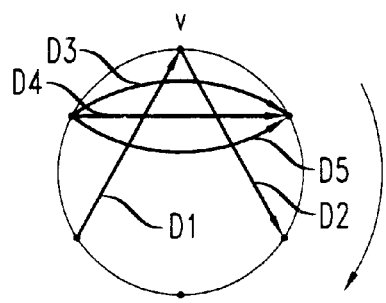
FIG. 12 is a directed-arc representation of certain demands, presented to illustrate the procedure of FIG. 11.
Figure 13:
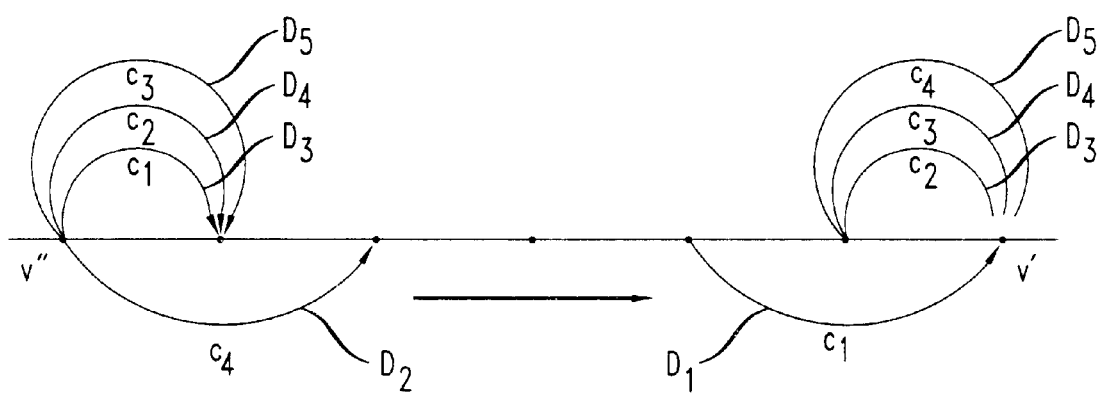
FIG. 13 is a graphical representation of the demands of FIG. 12 at an intermediate stage in the procedure of FIG. 11.

An example of the effect of rejoining the ring is provided by FIGS. 12 and 13. In the clockwise ring network of FIG. 12, the demand labeled D1 terminates at node v, the demand labeled D2 originates at node v, and the demands labeled D3–D5 pass over node v without originating or terminating there.

The ring network of FIG. 12 is opened at node v to yield the directed linear network of FIG. 13. Demand D1 is assigned wavelength $c_1$, and demand D2 is assigned wavelength $C_4$. Each of demands D3, D4, and D5 becomes a sub-demand pair, assigned the respective pairs of colors ($c_1$, $c_2$), ($c_2$, $c_3$), and ($c_3$, $c_4$). A wavelength translator at the rejoined node v can perform the following translations: for D3, $c_1 \rightarrow c_2$, for D4, $c_2 \rightarrow c_3$, and for D5, $C_3 \rightarrow c_4$. If no wavelength translator is available, three new wavelengths are introduced to carry demands D3, D4, and D5, respectively.

Figure 14:
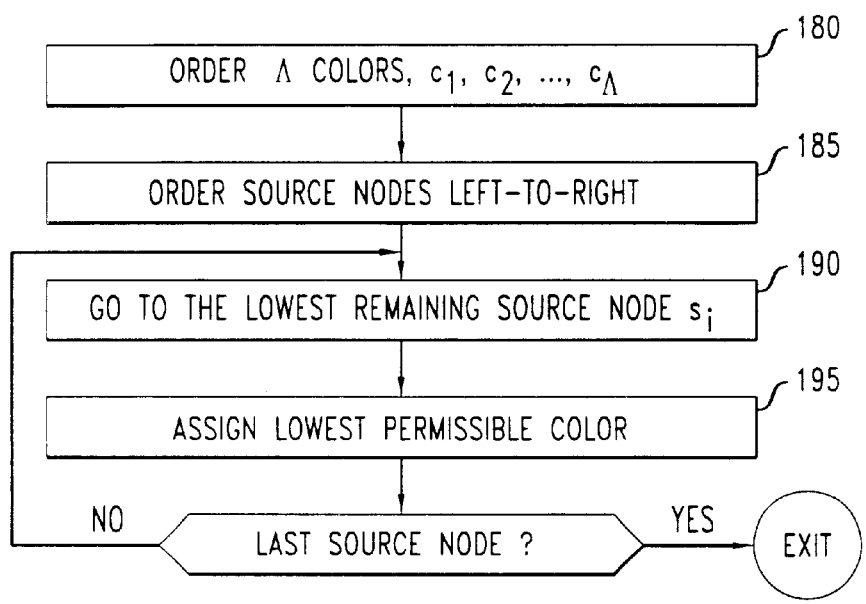
FIG. 14 is a flowchart of a greedy algorithm for wavelength-assignment, useful in performing some embodiments of the procedure of FIG. 11.

With reference to FIG. 14, we now describe one example of a greedy algorithm for coloring routed demands. A set of Λ colors is ordered $c_1, c_2, \ldots, c_\Lambda$ (block 180). The source nodes $s_i$ of the routed demands are ordered from, e.g., left to right (block 185). Each demand, identified by its respective source node, is then processed in turn, in an iteration of blocks 190 and 195.

At block 190, the lowest remaining source node is found. At block 195, the lowest-ranked permissible color is assigned to the corresponding demand. A color is "permissible" if it can be assigned without overlapping a demand that previously was assigned the same color.

Figure 15:
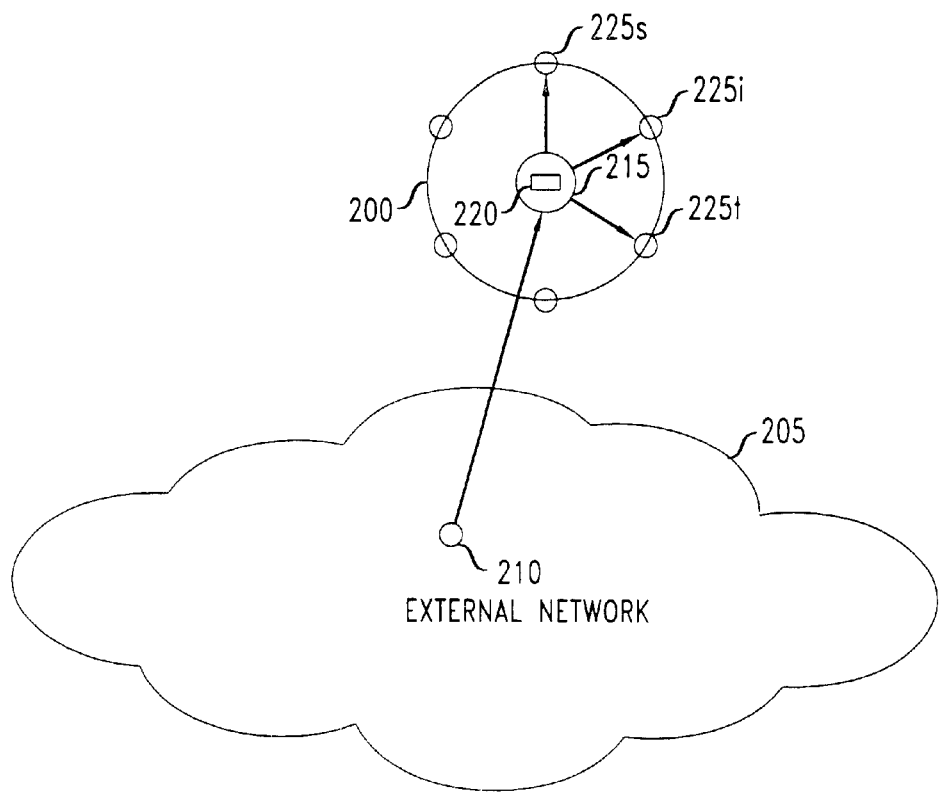
FIG. 15 is a schematic diagram of an illustrative directed ring network, including a centralized authority for making routing decisions.

Turning now to FIG. 15, an illustrative ring network 200 is there shown as communicating with external network 205, which is, for example, a communication network of regional or national scope. (Indeed, many networks similar to network 200 may be subsumed within network 205.) When a customer 210 within the external network sends a request to network 200, the request is typically received and processed by a central authority 215. At (or in communicative contact with) central authority 215 is a digital processor 220 for carrying out routing and, if pertinent, wavelength-assignment (or other channel-assignment) procedures such as those described here. Processor 220 is exemplarily a general purpose or special purpose digital computer operating under the control of an appropriate program, expressed in software, firmware, or hardware.

With further reference to FIG. 15, routing information and, e.g., wavelength-assignment information are sent from central authority 215 to source node 225s, target node 225t, and all intermediate nodes, such as node 225i in the figure. At each node, a switch (not shown) is set or a port (not shown) is assigned (the assigned port is an input or output port, or, in an intermediate node, both are assigned), according to well-known procedures, so that an available path is maintained for the routed demand. In a WDM network, an appropriate light source is made available for placing the data to be transmitted on the assigned wavelength channel.

What is claimed is:

1. A method for routing a set of demands in a ring network that comprises nodes interconnected by directed links, wherein:
    a) each demand may be routed in the clockwise circulatory direction or in the counterclockwise circulatory direction;
    b) the method comprises solving a linear program to obtain a set of routing variables that minimize an objective function;
    c) each routing variable corresponds to a respective one of the demands;
    d) each routing variable has a value that falls on an interval that runs between and includes a higher and a lower endpoint, one endpoint signifying that the corresponding demand is routed clockwise, and the other endpoint signifying that said demand is routed counterclockwise;
    e) a load of at least one kind is associated with each link of the network;
    f) the objective function describes the value of said load maximized over all links of the network, so that a solution of the linear program provides a minimum value of the maximized load;
    g) the method further comprises rounding the routing variables so that the value of each routing variable falls at one of the endpoints;
    h) the rounding is carried out such that the maximized load does not exceed said minimum value; and
    i) the method further comprises routing each of the demands clockwise or counterclockwise, in accordance with the value of its respective routing variable.

2. The method of claim 1, wherein the load is the number of demands routed clockwise or counterclockwise on a link.

3. The method of claim 1, wherein at least one link has multiple channels, and for each link, the load is the greatest number of demands routed, clockwise or counterclockwise, on any of its channels.

4. The method of claim 1, wherein:
    each link has at least one channel, each said channel to be referred to as a fiber;
    each fiber has at least one sub-channel;
    each sub-channel is either free or else it is occupied by a previously routed demand;
    each fiber has a capacity, said capacity defined as the number of free sub-channels on that fiber; and
    for each link, the load is the excess of routed demand over capacity, maximized over all fibers of that link.

5. The method of claim 1, wherein the solving of a linear program is carried out such that the respective routing variables must sum to an integer.

6. The method of claim 5, wherein the rounding of the routing variables comprises:
    a) among all demands whose routing variables fall at neither of the endpoints, identifying those pairs of demands that are parallel;
    b) rounding at least one routing variable of each of said parallel pairs; and
    c) then rounding the remaining routing variables.

7. The method of claim 6, wherein the lower endpoint is 0, the higher endpoint is 1, and the rounding of at least one routing variable of each parallel pair is carried out such that:
    a) the sum is taken of the respective routing variables of the parallel pair;
    b) if said sum is less than 1, one of the routing variables assumes the value of said sum, and the other routing variable assumes the value 0; and
    c) if said sum is greater than 1, one of the routing variables assumes the value 1, and the other routing variable assumes a value that is equal to the difference between said sum and 1.

8. The method of claim 7, wherein each demand has a source node and a target node, the source nodes and target nodes have a sequential order, and the rounding of the remaining routing variables comprises:
    a) arranging said variables in circular order by source node or target node;
    b) for each of multiple iterations, keeping a sum of terms, in which each said term is a difference between: (i) a respective already-rounded routing variable, if any, and (ii) the original value of said variable; and
    c) in each of said iterations, rounding a respective routing variable, said routing variables taken successively in said circular order, wherein the respective routing variable is rounded up if said sum is less than a threshold, and rounded down if said sum is greater than the threshold.

9. The method of claim 1, wherein the ring network is a WDM network, and the method further comprises assigning wavelengths to the demands.

10. The method of claim 9, wherein the ring network is a wavelength-interchanging WDM network, and L distinct wavelengths are assigned to the demands, wherein L is equal to said minimum value of the maximized load.

11. The method of claim 9, wherein the assigning of wavelengths comprises:
    a) representing the ring network as a pair of directed linear networks, in each of which one node of the ring network, to be referred to as the cut node, is represented as two respective image nodes situated at opposite ends of the linear network; and
    b) assigning at most L wavelengths to each of the linear networks, wherein L is equal to said minimum value of the maximized load.

12. The method of claim 11, wherein precisely one wavelength translator is active in the ring network, and the cut node is situated at the location of the wavelength translator.

13. The method of claim 11, further comprising assigning at most L−1 additional wavelengths to demands that are routed through the cut node.

14. A system for routing demands on a directed ring network that comprises a plurality of nodes connected in circular sequence by clockwise and counterclockwise links, each link supporting a plurality of communication channels, wherein:
    a) the system comprises a central authority in communicative relationship to each of said nodes;
    b) the central authority is adapted to receive demands, each said demand including a designation of a source node and a target node;
    c) the central authority comprises a digital processor effective to issue a decision whether to route each received demand clockwise or counterclockwise from the pertinent source node to the pertinent target node;

d) the central authority is adapted to send each said decision to the pertinent source and target nodes, and to each node that intervenes between said source and target nodes with respect to the routed demand;

e) the digital processor comprises means for solving a linear program to obtain a set of routing variables that minimize an objective function, wherein each routing variable corresponds to a respective one of the demands;

f) each routing variable has a value that falls on an interval that runs between and includes a higher and a lower endpoint, one endpoint signifying that the corresponding demand is routed clockwise, and the other endpoint signifying that said demand is routed counterclockwise;

g) a load of at least one kind is associated with each link of the network;

h) the objective function describes the value of said load maximized over all links of the network, so that a solution of the linear program provides a minimum value of the maximized load; and i) the digital processor further comprises means for rounding the routing variables so that the value of each routing variable falls at one of the endpoints, the rounding carried out such that the maximized load does not exceed said minimum value.

15. The system of claim 14, wherein the ring network is a WDM network in which each link supports a plurality of wavelength channels, and the digital processor further comprises means for assigning a wavelength channel to each routed demand; and the wavelength-assigning means comprise:

a) means for representing the ring network as a pair of directed linear networks, in each of which one node of the ring network is represented as two respective image nodes situated at opposite ends of the linear network; and b) means for assigning at most L wavelengths to each of the linear networks, wherein L is equal to said minimum value of the maximized load.

* * * * *